(12) United States Patent
Voigtländer et al.

(10) Patent No.: US 7,684,935 B2
(45) Date of Patent: Mar. 23, 2010

(54) FIBER CABLE CUTTING DEVICE

(75) Inventors: Carsten Voigtländer, Klein Rönnau (DE); Matthias Strebe, Neumünster (DE)

(73) Assignee: Oerlikon Textile GmbH & Co. KG, Remschied (DE)

( * ) Notice: Subject to any disclaimer, the term of this patent is extended or adjusted under 35 U.S.C. 154(b) by 230 days.

(21) Appl. No.: 11/925,223

(22) Filed: Oct. 26, 2007

(65) Prior Publication Data

US 2008/0110310 A1  May 15, 2008

Related U.S. Application Data

(63) Continuation of application No. PCT/EP2006/003674, filed on Apr. 21, 2006.

(30) Foreign Application Priority Data

Apr. 26, 2005 (DE) ........................ 10 2005 019 263

(51) Int. Cl.
*G01B 3/44* (2006.01)
(52) U.S. Cl. ............................... 702/34; 83/169; 83/343
(58) Field of Classification Search ............. 702/33–35, 702/105, 159, 171; 83/62.1, 72, 343, 169; 385/134

See application file for complete search history.

(56) References Cited

U.S. PATENT DOCUMENTS 4,758,964 A  7/1988 Bittner et al.
4,771,665 A  9/1988 Van Doorn et al.
6,176,166 B1*  1/2001 Mattinger et al. ............. 83/169
6,701,055 B2*  3/2004 Yasuda ........................ 385/134
6,758,121 B2  7/2004 Peters et al.

FOREIGN PATENT DOCUMENTS

| DE | 36 27 796 C1 | 10/1987 |
| DE | 40 23 663 A1 | 2/1991 |
| DE | 41 16 345 A1 | 11/1992 |
| DE | 199 50 215 A1 | 6/2001 |
| DE | 102 42 553 A1 | 4/2003 |
| EP | 0 305 057 A2 | 3/1989 |

OTHER PUBLICATIONS

Overzier, DE-19950215 A1, Jun. 13, 2001, English translation.*
International Search Report for PCT/EP2006/003674, completed Jul. 7, 2006, and mailed Jul. 18, 2006.
International Preliminary Report on Patentability and Written Opinion for PCT/EP2006/003674, issued Oct. 30, 2007.

* cited by examiner

*Primary Examiner*—John H Le
(74) *Attorney, Agent, or Firm*—Alston & Bird LLP

(57) ABSTRACT

A device is disclosed for continuously cutting a fiber cable into sections, as well as a process for operating this device. The device includes a rotary knife carrier fitted with a plurality of knife blades, against which the fiber cable is pressed via a compression wheel. Wear and break of the knife blades are sensed by one or more structure-borne noise sensors. In addition, a characteristic parameter is formed from the signal from the structure-borne noise sensor(s) and compared with a comparison value. Deviations from the comparison value are recognized as disturbances.

16 Claims, 2 Drawing Sheets

FIBER CABLE CUTTING DEVICE

CROSS-REFERENCE TO RELATED APPLICATIONS

The present application is a Continuation of International Application No. PCT/EP2006/003674, filed Apr. 21, 2006, and which designates the U.S. The disclosure of the referenced application is incorporated herein by reference.

FIELD OF THE INVENTION

The invention relates to a device for cutting a fiber cable.

BACKGROUND OF THE INVENTION

A device of the generic type for cutting a fiber cable is known from patent application EP 0 305 057 A2. Here, a fiber cable is guided through between two rolling wheels. One of the wheels here, which functions as a cutter carrier, has a plurality of cutter blades whose cutting edges are oriented perpendicularly with respect to the running direction of the fiber cable. The function of the second wheel is to press the fiber cable against the cutting edges so that the fiber cable is cut into a plurality of small sections. In the device shown in patent application EP 0 305 057 A2, the rotational axes of the cutter carrier and of the pressing wheel are oriented in parallel so that the two wheels roll on their external circumference. The cutting edges of the cutter blades are arranged tangentially here.

In contrast, laid-open patent application DE 102 42 553 A1 discloses a different orientation of a pressing wheel compared to the cutter carrier, in which orientation the axes intersect at an acute angle. Here, the end faces of the pressing wheel and of the cutter carrier roll, while the cutting edges of the cutter blades are arranged radially here. The fiber cable is guided through between the end faces and cut into pieces.

Basically, when a device for cutting a fiber cable operates there is the problem of the cutting edges of the cutter blades being subject to wear. This wear is brought about particularly as a result of urea additives in the fiber cable. Even though it is current practice to change the cutting edges after a specific operating period, this leads, not insignificantly, to increased costs owing to the associated interruption in operation. It is therefore desirable to aim at a situation in which the cutting edges are changed according to need. In this regard, patent application EP 0 305 057 A2 proposes a force measuring device by means of which the force acting between the cutter blade and a pressing wheel is measured. Provided that there is a significant correlation between the measured force and the wear of the cutting edges it is thus possible to monitor the wear state of the cutting edges.

In the device presented in EP 0 305 057 A2, the axis of the pressing wheel is mounted in a rocker which moves in the pressing direction. In this context, the pressing force is conducted directly through a force measuring sensor which is arranged in the force flux and measures the pressing force.

During the development of devices for cutting fiber cables it has become apparent that the arrangement of the cutter carrier and pressing wheel which is shown in DE 102 42 553 A1 has advantages and it is therefore preferred. However, it is not possible to integrate a similarly simple and effective force measuring device such as that in EP 0 305 057 A2 into this arrangement. Furthermore, frictional forces which falsify the measurement result act between the cutter carrier and pressing wheel. This applies particularly to the preferred arrangement.

An object of the invention is therefore to make available a simple and effective measuring device for the arrangement of the cutter carrier and pressing wheel which is shown in DE 102 42 553 A1 which detects the wear on the cutting edges.

SUMMARY OF THE INVENTION

The above object and others are achieved according to the invention in that the cutter carrier is connected to a sensor system which is formed from one or more structure-borne sound sensors which sense the structure-borne sound emitted during the cutting process.

Structure-borne sound is understood to refer to transient sound waves which propagate in the component. Sound waves are excited by a sudden release of energy as a result of the cutting process of the individual filaments of the fiber cable. This cutting process of the filaments causes the emission of structure-borne sound in a typical frequency spectrum. If the quality, in particular the sharpness of the cutting blade, then changes owing to wear or the shape of the cutting edge due to partial fractures, this has an influence on the emitted structure-borne sound which also changes in its energy distribution in the frequency spectrum. The advantage of the invention is that the sensor can be installed easily without it having to be provided directly or indirectly in the force flow. Instead, it is sufficient if the sensor is connected to the cutter blades in a way which conducts structure-borne sound well. In one non-limiting example, an oscillation sensor, which converts the mechanical oscillations into electrical signals, in particular in the high frequency range, is suitable for the measurement of structure-borne sound.

In one preferred embodiment, one or more structure-borne sound sensors are therefore connected directly to the cutter carrier. Provided that there is a connection to the cutter blades which conducts structure-borne sound well, the structure-borne sound which is emitted by the cutting process can therefore be sensed.

In one embodiment variant, a sensor is assigned to each cutter blade. This permits a connection between the cutter blade and sensor which conducts structure-borne sound well owing to the spatial proximity and the sensor. In addition, a variable signal can be particularly well detected by an individual cutter blade in this way. In another embodiment variant, in each case one sensor is assigned to a group of cutter blades. This permits a significantly lower degree of expenditure on sensors.

In a further, particularly cost-effective embodiment variant, a common sensor is assigned to the cutter carrier, which sensor monitors all the cutter blades simultaneously. This embodiment variant makes use of the fact that during operation only some of the cutter blades are involved in the cutting process at one time, as a result of which a sufficiently precise measurement is nevertheless possible.

One advantageous embodiment of the invention provides for the structure-borne sound sensor or sensors to be connected to an evaluation system. This evaluation system monitors the signal of the structure-borne sound sensor or sensors for features which occur in the case of wear on the cutting edges or in the case of a fracture in a cutter blade.

A method for monitoring the state of the cutter blades of a previously described device by means of a structure-borne sound sensor comprises, after measurement of the structure-borne sound, firstly the extraction of a characteristic variable which represents the cutting process. The characteristic variable which is particularly suitable for this becomes apparent only from the design of the cutter carrier and the arrangement of the structure-borne sound sensor or sensors and can be determined experimentally by a person skilled in the art of signal processing. In this context, in particular the frequency ranges whose signal strength changes with increasing abrasive wear or as a result of small, partial notches in the cutter blades are to be sought. The same applies to the frequency ranges which, when there is a fracture in a cutter blade, change permanently or else for a short time due to the fracture process. In the selection of frequency ranges, it is necessary to take into account disruptive sources of structure-borne sound, for example of roller bearings, and if appropriate to exclude them from the frequency spectrum to be analyzed.

The characteristic variables which are formed in this way, for example the signal power within a specific frequency band, is compared continuously with the comparison value or comparison range and a fault is signaled when there are deviations.

In one preferred extension of the method, the characteristic value of previous measurements which are to be assigned to the same cutter blade are used as a comparison value. This characteristic value can be formed, for example, from the mean value of the measurements. In this way it is possible to detect long term changes in the cutting characteristic.

In a further preferred extension of the method, the characteristic value or the mean value from the characteristic values of previous measurements which are to be assigned to one or more earlier revolutions of the cutter carrier is used as a comparison value. In this way it is possible, for example when there is a periodic fluctuation in the characteristic value in synchronism with the rotational speed of the cutter carrier, to conclude that there is a fracture in a cutting edge.

In one variant of the method, the measurement signal is obtained in each case from a sensor which is assigned to each cutter blade.

In another variant of the method, the measurement signal is obtained in each case from a sensor which is assigned to a group of cutter blades.

In a further variant of the method, the measurement signal is obtained from one sensor which is assigned to the entire cutter carrier.

BRIEF DESCRIPTION OF THE DRAWINGS

The inventive method will be described in more detail hereinbelow with the aid of an exemplary embodiment of the inventive apparatus, with reference to the accompanying drawings.

DETAILED DESCRIPTION OF PREFERRED EMBODIMENTS

Figure 1:
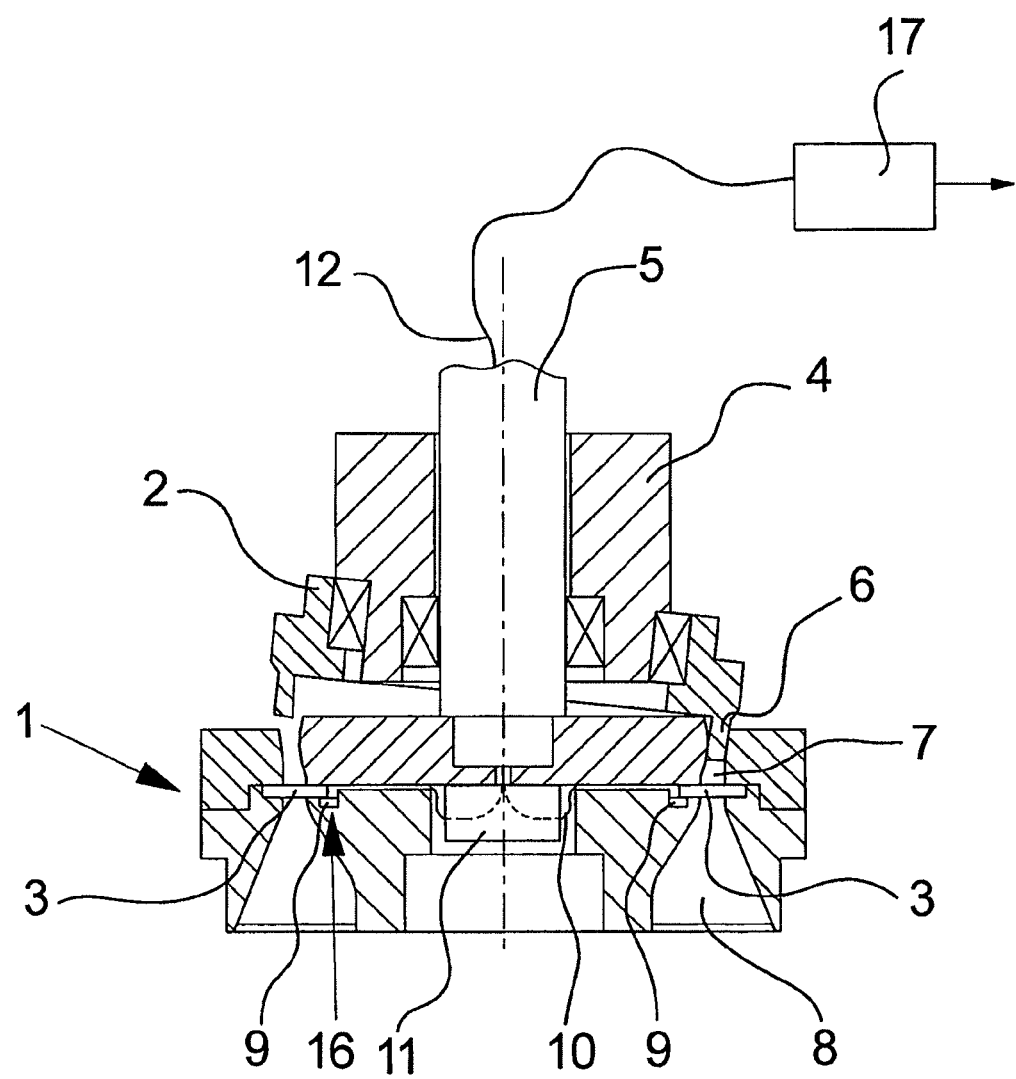
FIG. 1 shows a device for continuously cutting a fiber cable.

FIG. 1 shows a device according to the invention for continuously cutting a fiber cable. The device is composed of a cutter carrier 1 and a pressing wheel 2 which interacts with the cutter carrier 1. The cutter carrier 1 has a plurality of cutter blades 3 for cutting the fiber cable. The fiber cable (not shown here) is guided in the fiber cable duct 7 between the pressing wheel 2 and cutter carrier 1, with the pressing wheel 2 pressing the fiber cable against the cutter blades 3 by means of a pressing face 6. The cutter carrier 1 and pressing wheel 2 are essentially co-axial but are arranged with their axes at an acute angle to one another, mounted rotatably on a common carrier 4. A drive device (not illustrated here) causes the cutter carrier 1 which is driven by the drive 5 and the pressing wheel 2 to rotate synchronously. Owing to this arrangement, the end faces of the cutter carrier 1 and of the pressing wheel 2 roll on one another and interact with one another. Through another arrangement of the axes with respect to one another it is also possible, for example, for the circumferential face and end face or else for both end faces to roll on one another.

The fiber cable is introduced into the fiber cable duct 7 at a freely accessible location. In the course of the rotation of the cutter carrier 1, the fiber cable is pressed against the cutter blades 3 by the pressing face 6, as a result of which the fiber cable is cut into a plurality of sections whose length corresponds to the distance between the cutter blades 3. The sections which are cut in this way fall downward through an opening 8 and are fed to further processing means.

The cutter blades 3 are in direct contact here with one sensor 9 each, or in an alternative embodiment with a sensor 9 which is assigned to a plurality of cutter blades 3. The sensors 9 each have a connecting line 10 and said connecting lines 10 are combined in a distributor box 11 and connect to a connecting line 12. The sensors 9 together form the sensor system 16. The signals of the sensor system 16 are passed on to an evaluation system 17 for signal processing.

As a result of the cutting process, in particular as a result of the cutting of the filaments of the fiber cable, energy is suddenly released and said energy leads to transient, high-frequency structure-borne sound waves. These structure-borne sound waves are sensed by the sensors 9 directly at the location where they are produced.

Figure 2:
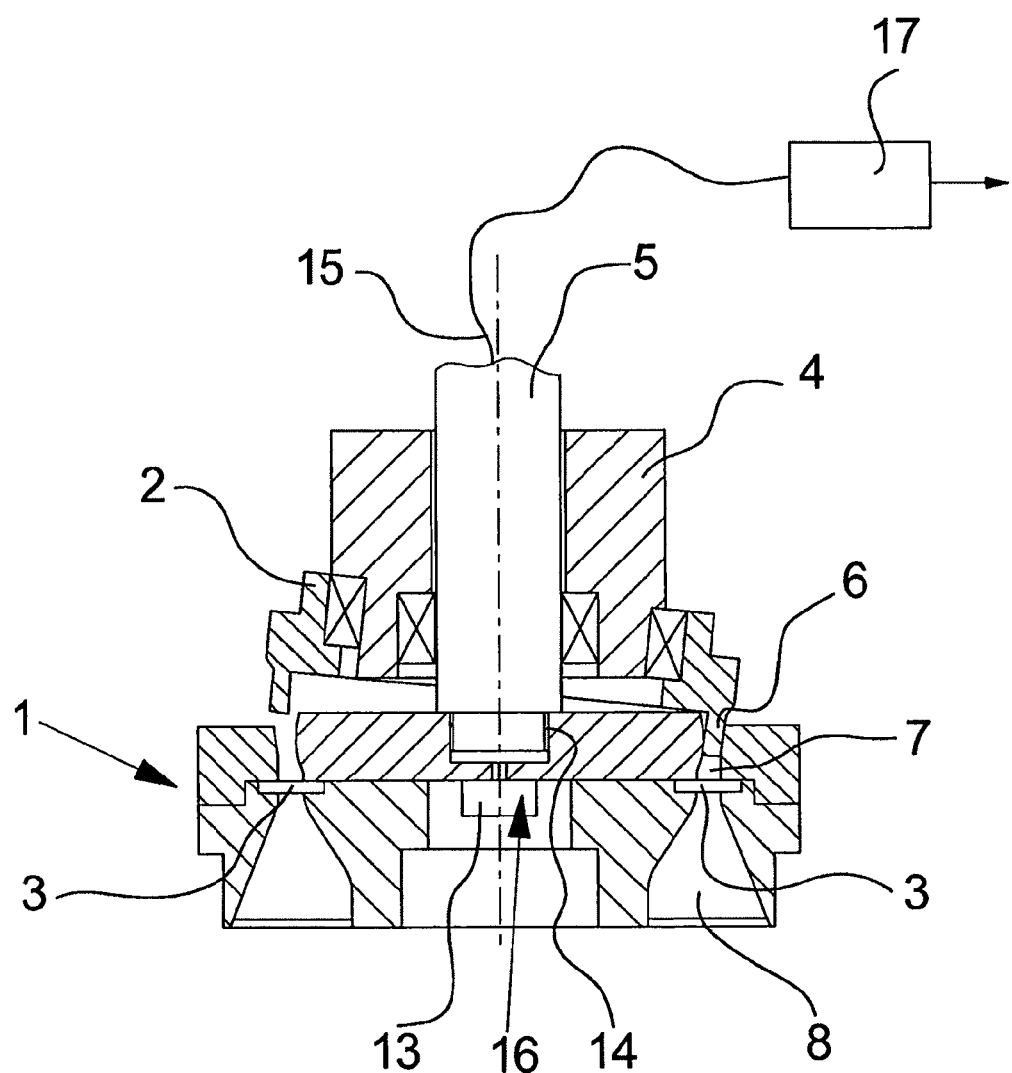
FIG. 2 shows an alternative embodiment of the device of FIG. 1.

FIG. 2 illustrates an alternative embodiment of the device. For the sake of simplification, reference is made here only to the differences from the device illustrated in FIG. 1.

Instead of the plurality of sensors 9, the sensor system 16 is formed here by an individual central sensor 13 which senses the structure-borne sound of all the cutter blades 3 which are involved in the cutting process at a particular time and passes on the sensor signals via the connecting line 15 to the evaluation system 17 for signal processing. Although the sensor 13 is provided here at a certain distance from the cutter blades 3, it is favorable within the sense of propagation of structure-borne sound to connect it to the cutter blades 3 without damping components. The advantage of this embodiment is that here only a single structure-borne sound sensor is used. In order, nevertheless, to ensure a high degree of sensitivity, disruptive structure-borne sound from other sources, such as for example roller bearings, is screened by a damping sleeve 14.

That which is claimed:

1. A device for continuously cutting a fiber cable into sections, said device comprising:
   a rotatable cutter carrier for holding a plurality of cutter blades;
   a rotatably mounted pressing wheel for pressing the fiber cable, which is configured to be guided between the cutter carrier and the pressing wheel, against the cutter blades; and
   a sensor system for sensing the state of the cutter blades, wherein the sensor system is based on one or more structure-borne sound sensors for measuring structure-borne sound which is emitted during the cutting process, and wherein the one or more structure-borne sound sensors are connected to the cutter carrier.

2. The device as claimed in claim 1, wherein a structure-borne sound sensor is assigned to each cutter blade.

3. The device as claimed in claim 1, wherein a structure-borne sound sensor is assigned to the plurality of cutter blades.

4. The device as claimed in claim 1, wherein a structure-borne sound sensor is assigned to the cutter carrier.

5. The device as claimed in claim 1, wherein the sensor system is connected to an evaluation system for detecting a fault.

6. The device as claimed in claim 5, wherein the evaluation system detects fracture of a cutter blade as a fault.

7. The device as claimed in claim 5, wherein the evaluation system detects wear of a cutter blade as a fault.

8. A method for monitoring the state of the cutter blades of a device for continuously cutting a fiber cable into sections, said method comprising:
   providing a device for continuously cutting a fiber cable into sections comprising a rotatable cutter carrier for holding a plurality of cutter blades, a rotatably mounted pressing wheel for compressing the fiber cable, which is guided between the cutter carrier and the pressing wheel, against the cutter blades, and a sensor system which is based on the measurement of structure-borne sound emitted during the cutting process and which senses the state of the cutter blades;
   measuring the structure-borne sound emitted by the cutting process;
   extracting a characteristic variable;
   comparing the characteristic variable with a comparison value; and
   signaling a fault if there is a deviation from the comparison values,
   wherein the sensor system has a sensor which is assigned to the cutter carrier and with which the structure-borne sound of all the cutter blades is sensed.

9. The method as claimed in claim 8, wherein frequency analysis is used when the characteristic variable is extracted.

10. The method as claimed in claim 8, wherein the characteristic variable represents the cutting process with a correct cutting edge, and wherein a blade fracture is detected if there is a deviation from the comparison value.

11. The method as claimed in claim 8, wherein the characteristic variable represents the cutting process with a sharp or blunt blade, and wherein the progress of the wear on the blade is detected when there is a deviation from the comparison value.

12. The method as claimed in claim 8, wherein the comparison value is formed from the characteristic variables of preceding measurements.

13. The method as claimed in claim 12, wherein the preceding measurements which are to be assigned to the same cutter blade are used.

14. The method as claimed in claim 12, wherein the preceding measurements of one or more revolutions of the cutter carrier are used.

15. The method as claimed in claim 8, wherein the sensor system has one sensor per cutter blade.

16. The method as claimed in claim 8, wherein the sensor system has a sensor for a plurality of cutter blades.

\* \* \* \* \*

UNITED STATES PATENT AND TRADEMARK OFFICE
CERTIFICATE OF CORRECTION

| | | |
|---|---|---|
| PATENT NO. | : 7,684,935 B2 | Page 1 of 1 |
| APPLICATION NO. | : 11/925223 | |
| DATED | : March 23, 2010 | |
| INVENTOR(S) | : Voigtländer et al. | |

It is certified that error appears in the above-identified patent and that said Letters Patent is hereby corrected as shown below:

Column 5,
Line 28, "values" should read --value--.

Signed and Sealed this
Tenth Day of April, 2012

David J. Kappos
*Director of the United States Patent and Trademark Office*